United States Patent [19]

Buchholz

[11] 4,110,053
[45] Aug. 29, 1978

[54] ARRANGEMENT FOR FASTENING A STEEL DOWEL

[76] Inventor: Josef Buchholz, Birkenweg 5, 5581 Liesenich, Fed. Rep. of Germany

[21] Appl. No.: 732,131

[22] Filed: Oct. 13, 1976

[30] Foreign Application Priority Data

Oct. 15, 1975 [DE] Fed. Rep. of Germany ..... 25461103
Jan. 9, 1976 [DE] Fed. Rep. of Germany ....... 2600610

[51] Int. Cl.$^2$ ............................................. B25G 3/02
[52] U.S. Cl. .................................... 403/361; 403/292; 52/585
[58] Field of Search ............... 403/292, 295, 296, 298, 403/408, 361; 52/585, 309.1, 309.3, 436, 442, 232

[56] References Cited

U.S. PATENT DOCUMENTS

| 3,284,113 | 11/1966 | Howell | 403/298 X |
| 3,360,285 | 12/1967 | Huckshold | 403/292 |
| 3,405,592 | 10/1968 | Blodee | 52/585 X |
| 3,639,137 | 2/1972 | Marinelli | 151/14.5 UX |
| 3,756,635 | 9/1973 | Beers | 403/292 |

FOREIGN PATENT DOCUMENTS 1,381,286  2/1975  United Kingdom ........................ 85/63

*Primary Examiner*—Wayne L. Shedd
*Attorney, Agent, or Firm*—Max Fogiel

[57] ABSTRACT

An arrangement for fastening a steel dowel in a dowel hole of a structural member, in which the structural member consists particularly of concrete or wood. A synthetic resin layer is located on the wall of the dowel hole, and the steel dowel is coated with a synthetic resin-filler mixture. The coating of the steel dowel, furthermore, is roughened and may have a ribbed surface. The cross-section of the steel dowel may have a circular or square shape, and the dowel may be an elongated rod or structural angle. A hardener or similar catalyst may be applied to the roughened synthetic resin coating of the steel dowel by means of spraying or immersion.

1 Claim, 7 Drawing Figures

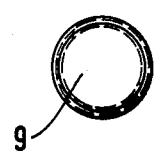
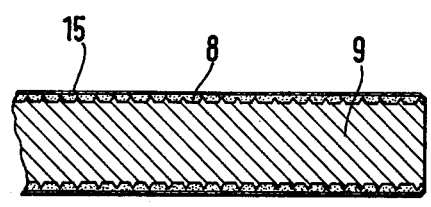
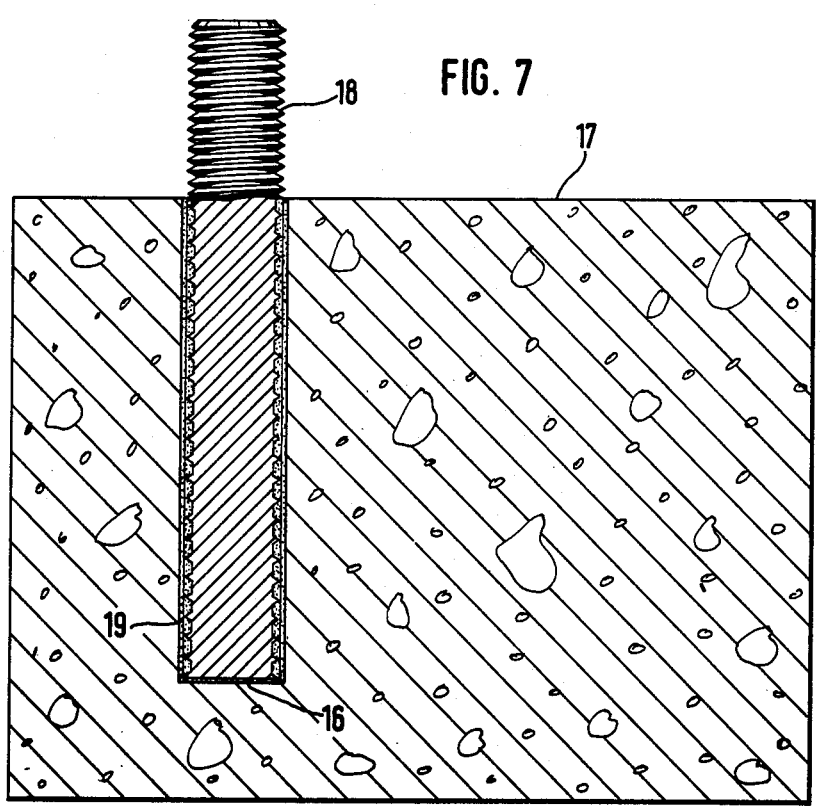

ARRANGEMENT FOR FASTENING A STEEL DOWEL

BACKGROUND OF THE INVENTION

The present invention relates to an arrangement for fastening a steel dowel in the dowel hole of a structural member, particularly a concrete or wood structural member.

It is already known in the art how to use dowels made of wood, steel or plastic for connecting two structural members. These dowels fulfill their purpose by pressure or adhesive action on the material surrounding them. Dowels which use pressure action can be used only where sufficient material volume is present. If the material volume surrounding these dowels is too small, the material will break out as soon as there is a small load at the installed location. Another disadvantage of such dowels is their sensitivity to vibration, and it is for this reason that they cannot be used for structural members made of certain materials. Dowels using the adhesive action require an extended irregular hardening time for the adhesive which depends on the type of destruction of the glass vials containing the adhesive and, on the other hand, on the imprecisely determined mixing of the adhesive. In addition, the application limits of wood and plastic dowels are reduced by their material strength.

It is, therefore, an object of the present invention to eliminate in an arrangement of the above-described type, the pressure action of the dowel as much as possible and to ensure a sufficient high-capacity transfer of force.

Another object of the present invention is to provide a fastening arrangement of the foregoing character which has a substantially long service life, and is free from environmental effects.

A still further object of the present invention is to provide a dowel fastening arrangement, as described, which may be economically fabricated and easily installed.

SUMMARY OF THE INVENTION

The objects of the present invention are achieved by providing that a synthetic resin layer is located on the wall of the dowel hole and the steel dowel is coated with a synthetic resin-filler mixture. In order to increase the adhesion in a simple manner, in another improvement of the present invention, the surface of the coating on the steel dowel of synthetic resin filler mixture is roughened. Another improvement of the invention has the surface of the steel dowel ribbed, achieving a close connection between the material of the steel dowel and its coating of synthetic resin-filler mixture.

However, this arrangement for fastening a steel dowel has the disadvantage of a limited pot time for mixing the synthetic resin layer, to be injected into the dowel hole, which comprises several components such as synthetic resin, catalyst, hardener, adhesive etc. Also, the pot time depends to a large extent on the ambient temperature, i.e., as a rule it is the shorter, the higher the ambient temperature.

Therefore, another improvement of the present invention provides that a hardener or similar catalyst be placed on the roughened coating of the steel dowel which coating consists of the synthetic resin-filler mixture. The hardener is conveniently sprayed on the coating of the steel dowel. In an alternative improvement, the hardener is placed on the coating of the steel dowel by means of the immersion process (in itself already known in the art).

The advantages achieved by the present invention are that the force transmission takes place due to the high adhesive action of the steel dowel, which itself has high strength, with the associated structural element. Accordingly, the danger of material break-out from a structural member is eliminated and there is no sensitivity to vibrations. Also, the arrangement in accordance with the present invention permits an extremely high load-carrying capacity for the steel dowel which can be easily inserted into the dowel hole. Finally, it is possible to adjust the setting (hardening) time of the synthetic resin to be introduced in the dowel hole in accordance with requirements.

By placing a hardener on the synthetic resin-filler mixture which surround the steel dowel, a single-component synthetic resin layer may be used for the dowel hole in a concrete structural member, thus eliminating the mixing of two or more components and thus pot time. By eliminating the pot time, a much quicker processing of the steel dowel is achieved.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 5 shows a steel dowel in accordance with the present invention, with a hardener (setting agent);

FIG. 6 shows a cross-section through the steel dowel of FIG. 5; and

FIG. 7 shows a view of a steel dowel of FIG. 5, inserted in a structural member, partially in section.

DESCRIPTION OF THE PREFERRED EMBODIMENTS

Figure 3:
FIG. 3 shows a cross-section of the steel dowel of FIG. 2.
Figure 2:
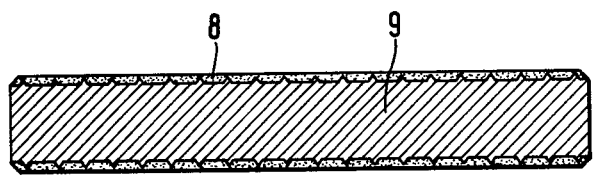
FIG. 2 shows a section of the steel dowel in FIG. 1.
Figure 1:
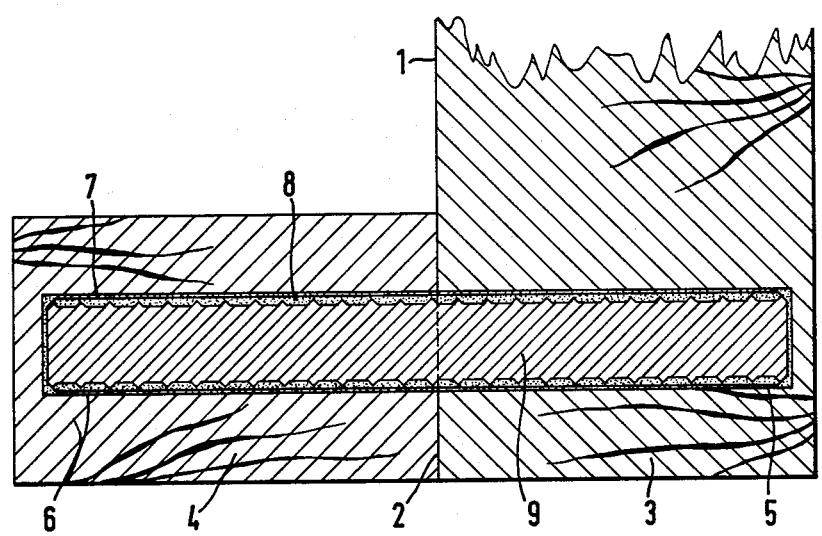
FIG. 1 shows a sectional side view of an arrangement in accordance with the present invention for connecting two wood structural members.

In sides 1, 2 of the wood structural members 3, 4 dowel holes 5, 6 face each other and are aligned with each other. The wall of dowel holes 5, 6 are covered with a thin synthetic resin layer 7 which is in direct adhesive connection with the coating 8, comprising a synthetic resin-filler mixture, of a steel dowel 9. The steel dowel 9 is a through-bolt, extending through both dowel holes 5, 6, with ribbed surface for better adhesive connection with coating 8. This steel dowel 9 is of circular cross-section, but may have any cross-section suitable for the purpose at hand. Also, the steel dowel may have a rod or angular shape.

In making the above arrangement, first a certain quantity of synthetic resin is placed into the two dowel holes 5, 6; then the steel dowel 9 with its coat 8, whose surface is roughened, is introduced into the dowel holes, with the excess synthetic resin in the dowel holes being forced out between the sides 1, 2 of the wood structural members. Then the wall of dowel holes 5, 6 and the coating of the steel dowel 9 are totally immersed in synthetic resin. After the resin has hardened, there is adhesion all the way through which protects the steel dowel from corrosion and thus ensures a permanent load-carrying capacity of the arrangement.

Figure 4:
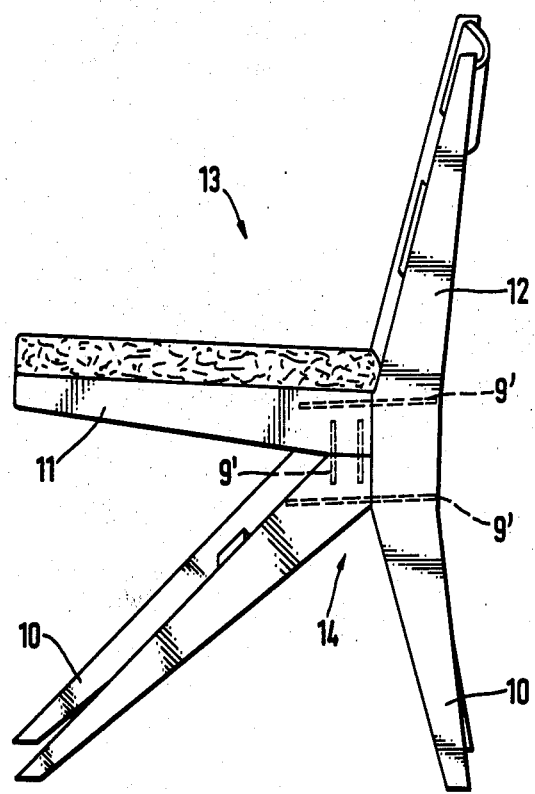
FIG. 4 shows another application of an arrangement in accordance with the present invention on a chair with a cantilevered seat.

The legs 10, the seat 11 and the backrest 12 of chair 13 of FIG. 4 are connected to one another through the repeated use of the invention in a corner 14. The vertical and horizontal steel dowels 9' of the corner connection system of chair 13 make possible an extremely high load-carrying capacity of the cantilevered seat 11, even though this design provides an unfavorable lever effect.

In the embodiment of FIG. 5, the ribbed or uneven surface of steel dowel 9 bears the coating 9 made of a synthetic resin-filler mixture. A hardener (setting agent) 15 is sprayed on this coating. The steel dowel 9 is inserted in the dowel hole 16 of a concrete structural member 17 with the free end of the steel dowel 9 being a threaded stud 18. In the space between the steel dowel 9 and the wall of dowel hole 16, there is a synthetic resin layer 19 made of a single-component resin.

In making the above-described arrangement, a certain quantity of the single-component resin is introduced into the dowel hole 16; then the steel dowel 9 with its coating 8, on which the hardener 15 has been sprayed, is introduced into the dowel hole 16, with the excess single-component resin being squeezed out from the dowel hole 16. The single component resin comes in contact with the hardener of the steel dowel, initiating the setting action. After the synthetic resin has hardened, there is adhesion throughout which protects the steel dowel 9 against corrosion and thus ensures permanent high load-carrying capacity of the arrangement.

It is within the scope of the present invention to coat the steel dowel with a synthetic resin mixture, without filler, because a roughened synthetic resin mixture coating may also receive a hardener which likewise provides a favorable process.

The arrangement in accordance with the present invention may be used with the most varied material dimensions and forms, e.g., as dowel a sleeve with an internal thread.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. An arrangement for fastening a steel dowel in a dowel hole of a structural member, particularly a concrete or wood structural member comprising: a synthetic resin layer on the wall of the dowel hole; a synthetic resin-filler mixture coated on said steel dowel, the surface of said coating of said steel dowel being roughened, the surface of said steel dowel being ribbed; and hardener means on the roughened synthetic coating of said steel dowel, said synthetic resin layer comprising a single-component resin, said synthetic resin mixture being free of a filler; and sleeve means with an internal thread connected to said steel dowel.

* * * * *